United States Patent [19]
Chang et al.

[11] Patent Number: 5,997,942
[45] Date of Patent: Dec. 7, 1999

[54] APPARATUS AND METHOD FOR FORMING OPTICAL FIBER COATING

[75] Inventors: Chester A. Chang; Kirk A. Hoover; Sharon Jones; Bruce W. Reding; Michael J. Todt, all of Wilmington, N.C.

[73] Assignee: Corning Incorporated, Corning, N.Y.

[21] Appl. No.: 08/837,623

[22] Filed: Apr. 21, 1997

[51] Int. Cl.[6] ..................................................... B05D 5/06
[52] U.S. Cl. ..................... 427/163.2; 427/299; 427/348; 427/358; 427/385.5; 427/434.7
[58] Field of Search ............................... 427/163.2, 358, 427/348, 385.5, 434.7, 299; 118/405, 420

[56] References Cited

U.S. PATENT DOCUMENTS

| | | | |
|---|---|---|---|
| 4,349,587 | 9/1982 | Aloisio, Jr. | 427/163.2 |
| 4,409,263 | 10/1983 | Aloisio, Jr. | 427/163.2 |
| 4,439,467 | 3/1984 | Kassahun et al. | 427/163.2 |
| 4,792,347 | 12/1988 | Deneka et al. | 65/3.11 |
| 5,127,361 | 7/1992 | Matsida et al. | 118/405 |
| 5,156,888 | 10/1992 | Haubs et al. | 427/163.2 |
| 5,588,997 | 12/1996 | Lysson et al. | 118/405 |

FOREIGN PATENT DOCUMENTS

| | | |
|---|---|---|
| 0579388 | 1/1994 | European Pat. Off. . |
| 0654453 | 10/1994 | European Pat. Off. . |
| 0733601 | 3/1996 | European Pat. Off. . |
| 3818266A1 | 7/1989 | Germany . |
| 54-131042 | 10/1979 | Japan . |

OTHER PUBLICATIONS

Patent Abstracts of Japan, The Patent Office Japanese Government, vol. 8, No. 199, Sept. 1984.

*Primary Examiner*—Janyce Bell
*Attorney, Agent, or Firm*—William J. Simmons, Jr.; David L. Berdan

[57] ABSTRACT

An apparatus and method for coating an optical wave guide fiber with a liquid polymer coating includes pressurizing a chamber with a process fluid and venting the process fluid along, and in a direction opposite the direction of travel of, the incoming fiber, to strip particles from the incoming fiber before the particles enter the die assembly.

19 Claims, 6 Drawing Sheets

APPARATUS AND METHOD FOR FORMING OPTICAL FIBER COATING

BACKGROUND OF THE INVENTION

The present invention relates to the coating of optical wave guide fibers with materials that are applied as liquids and are thereafter cured to form solid protective organic coatings on the fibers. More particularly, the invention relates to an improved apparatus and method wherein the number of inclusions in the organic coating material, particularly inclusions comprising particles, is reduced in order to improve the quality and integrity of the protective coating as cured, and thus the properties of the end product.

The application of organic coatings in liquid form to optical wave guide fibers for the purpose of protecting the glass fibers from damage is well known. A typical wave guide fiber as currently produced consists of a silica-based glass thread covered with two layers of protective acrylate coating. The glass thread acts as the wave guide and provides the vast majority of tensile strength to the fiber. The acrylate coating serves to protect the glass from damage by abrasion and/or external stresses both during the manufacturing process and in the field. In order to prevent damage during the manufacturing process, the coating is applied immediately after the glass fiber is drawn and prior to contact between the fiber and any other surface. optical fibers are being drawn at ever increasing speeds, and the apparatus for applying protective coatings must be capable of providing a high quality coating at those greater fiber draw speeds.

One problem that has been encountered in the high speed coating of glass fibers is the introduction of inclusions such as particles in the polymer coating. Inclusions adversely affect the performance of the optical wave guide fibers by creating a degradation of the mechanical properties of the coating.

For example, widely differing thermal expansion characteristics of the glass fiber and the coating become problematic in the presence of inclusions in the coating. Simple uniform stresses from tension and compression resulting from the uniform thermal expansion and contraction of the fiber and the coating do not severely affect the light-transmitting and strength characteristics of the wave guide fibers. However, uneven expansion or contraction due to inclusions in the coating causes concentrated bending stresses in both the coating and the glass fiber. Those stresses adversely affect both the light-conducting properties and the strength properties of the wave guide fiber in extreme temperature conditions.

In the case of particulate contamination of the coating layers, the more important problem is the potential for the particles to contact the glass fiber and initiate a flaw that could break instantly or grow to the point of failure on further handling. Contaminating particles are often silica-based and have sufficient hardness to easily scratch or penetrate the glass fiber. Failure analyses of wave guide fibers exhibit evidence of particles imbedded in the primary coating adjacent to the glass surface. A particle so positioned could initiate surface flaws in the glass during normal bending associated with processing steps such as spooling, or during installation of the fiber.

In a typical fiber coating process, the glass fiber is directed to a coating die assembly immediately after forming. The assembly includes a guide die, a reservoir for liquid coating material and a sizing die. The glass fiber passes through each of these components in succession. The liquid coating material adheres to the fiber and forms a coating that is later cured.

Several improvements to this process have been directed toward the reduction or elimination of bubbles in the coating. For example, a process fluid such as carbon dioxide, that is soluble in the liquid coating material, may be used to displace air entrained in a boundary layer on the surface of the optical fiber before the fiber passes through the reservoir containing the liquid coating material. The process fluid travels with the fiber into the liquid coating material and dissolves into the material rather than forming bubbles as would air.

Such a process is described in U.S. Pat. No. 4,792,347, assigned to the same assignee as the present application, and which is hereby incorporated by reference in its entirety herein. In that system, a conditioning unit is positioned around the incoming fiber for providing a countercurrent gas flow for displacing the entrained air on the optical fiber. An inner cylindrical sleeve of the conditioning unit has multiple gas flow orifices that direct the countercurrent gas flow onto the fiber.

A process fluid has also been directed through slots in a cooling means to form flows that are directed toward the fiber, as disclosed in U.S. patent application Ser. No. 08/409,231, which is assigned to the same assignee as the present application. In that device, helium is used to cool the fiber and to displace or strip air from the fiber at very high draw speeds. The excess helium and any entrained air stripped from the fiber is exhausted through a port in a direction away from the fiber.

While the displacement of entrained air with soluble process fluid has produced acceptable results in the reduction of bubbles in the fiber coating, other improvements in the process have also been attempted. In U.S. Pat. No. 5,127,361, the geometry's of the guide die and the sizing die are adjusted in order to reduce the number of bubbles formed in the coating at high draw speeds. In that apparatus, the size of the gap between the guide die and the sizing die is adjusted in combination with a taper of the hole in the sizing die to improve the coating process.

Another existing die assembly introduces a process fluid into a cylindrical chamber surrounding the portion of the fiber traveling into the guide die. The chamber vents to atmosphere at an open end opposite the guide die, and has a diameter of approximately 13 mm (0.500 inches). The process fluid is introduced through one or more passageways leading to the chamber near the guide die. The process fluid is allowed to flow out the open end of the chamber in a direction opposite the direction of travel of the fiber.

While the foregoing systems have been somewhat effective in reducing defects in liquid applied coatings, further improvement would be desirable. Current processes used for coating wave guide fibers do not effectively eliminate particulate contamination of the liquid coatings.

SUMMARY OF THE INVENTION

The present invention provides a method and apparatus for applying a coating with reduced contamination to an optical fiber. One method of the invention comprises passing the optical fiber into a reservoir containing a coating liquid, and then passing the fiber through and out of the reservoir so that a coating of the liquid adheres to the fiber. A flow of a process fluid is applied on the incoming fiber passing into the reservoir so that the fluid flows along the incoming fiber in a direction opposite to the direction of movement of the fiber.

The flow of process fluid has a maximum velocity of at least 1.5 meters per second near the fiber. Still higher velocities, at least about 14 meters/sec, more preferably at least about 27 meters/sec a nd most preferably at least about 35 meters/sec are even more effective. As further discussed below, two measures of fluid velocity can be utilized. The true "measured" velocity means the actual fluid velocity immediately outside a boundary layer surrounding the fiber. The "measured" velocity is measured using an instrument capable of detecting fluid velocity at individual points within the fluid flow. The "theoretical" maximum fluid velocity is the maximum fluid velocity within a velocity profile predicted from certain parameters of the system, such as pressure and orifice sizes, using equations and simplifying assumptions discussed below. The step of applying a process fluid gas which inhibits bubble formation comprises the step of creating a flowing process fluid gas theoretical maximum velocity of at least 10 meters per second. The jet of process fluid applied on the incoming fiber prevents particles from entering the coating fluid reservoir.

In the fiber drawing environment, the most difficult particles to repel are those which are entrained on the fiber, or in a boundary layer of air around the fiber, and which move towards the reservoir at the fiber velocity. Most preferably, the fluid stream is capable of repelling particles having the maximum density and size expected in a fiber draw environment, and having a velocity in the direction of fiber movement into the reservoir (the "fiber movement direction") comparable to the velocity of the fiber itself. As further discussed below, the work done by a process fluid stream on a particle to decelerate the particle increases with the velocity of the fluid stream, and can be calculated based upon parameters of the system such as flow rate, orifice size, particle size and particle density. If the work done in deceleration is equal to or greater than the kinetic energy of the particle moving along with the fiber at the fiber velocity, the particle will be repelled. Preferably, the parameters of the process fluid stream are selected so that for particles of the maximum expected density and size that pose a practical problem in the fiber drawing environment—typically about 50 microns diameter and density about that of silica, 2.1 gm/cm$^3$—the threshold velocity or maximum velocity of a particle which can be stopped, is greater than or equal to the velocity of the fiber moving towards the reservoir. Stated another way, the process fluid stream should be capable of stopping a particle of the maximum expected size and density traveling at the speed of the fiber. The invention therefore greatly reduces particulate contamination of the coating liquid under typical manufacturing conditions. By contrast, although it is now believed that prior arrangements having process fluid flow around the incoming optical fiber may have incidentally stopped some light, slow-moving particles from the coating liquid reservoir, those configurations were not effective in preventing larger or faster-moving particles from contaminating the coating.

Preferably, the step of passing the optical fiber into the reservoir is performed by passing the optical fiber through a chamber inlet port into a chamber and passing the fiber from the chamber into the reservoir containing the coating liquid, and then through the reservoir to a fiber outlet. The step of applying a process fluid desirably includes the step of pressurizing the chamber with the process fluid. The process fluid is vented away from the reservoir and through the chamber inlet port so that the fluid flows along the incoming optical fiber in a direction opposite the direction of the movement of the fiber. The process fluid stream as discussed above is directed out of the chamber inlet port, in the direction opposite to the fiber movement direction, and desirably stops particles before the particles enter the chamber inlet port. The step of venting the fluid may further include the step of maintaining the process fluid flow within at least a portion of the chamber in a direction opposite the fiber movement direction, so that the process fluid has a maximum velocity of at least 1.5 meters per second within the chamber near the fiber, throughout. Within the chamber as well, still higher maximum velocities as set forth above are preferred. The high-velocity flow within the chamber aids in stopping particles which are carried past the inlet orifice. The high-velocity flow within the chamber preferably is maintained over a substantial length of the chamber in the fiber movement direction.

Preferably, the chamber has a relatively small minimum diameter so that the desired high velocities can be provided in the stream of fluid issuing from the fiber inlet orifice even with relatively low mass flow rates of the process fluid. Thus, the process fluid may be vented at a rate of less than 10 standard liters per minute, more preferably less than 6 standard liters per minute. The process fluid may be air or another gas such as helium, carbon dioxide or another which inhibits bubble formation.

In another aspect of the invention, an apparatus for applying a coating to an optical fiber is provided. The apparatus comprises a die holder having a inlet end and an outlet end, a sizing die adjacent to the outlet end, defining a sizing die orifice, and a guide die disposed between the sizing die and the inlet end of the die holder, defining a guide die orifice. The guide die orifice and the sizing die orifice are generally coaxial with the fiber axis. The outlet and guide dies and the die holder define a liquid reservoir between the outlet and guide dies for containing a coating liquid. The apparatus includes means defining a chamber surrounding the fiber axis and extending from between the guide die and the inlet end of the die holder. The chamber has a diameter of less than 0.200 inches for a length of at least 0.400 inches and desirably has a minimum diameter of less than 0.180 inches and preferably less than about 3.8 mm (0.150 inches) at a location along the fiber axis, and process fluid port communicating with the chamber. A fiber can be moved along the fiber axis through the chamber and through the reservoir. A process fluid may be admitted to the chamber and passed from the chamber away from the liquid reservoir around the fiber.

DETAILED DESCRIPTION OF THE PREFERRED EMBODIMENTS

Figure 1:
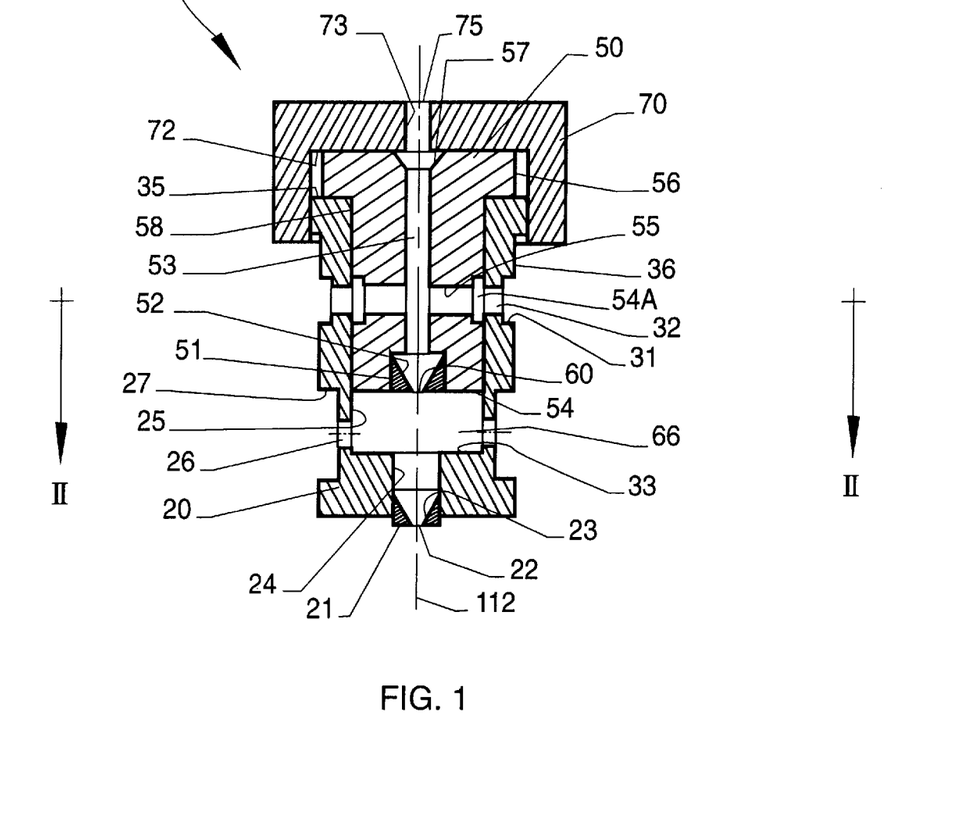
FIG. 1 is a cross sectional view of a die holder assembly according to the one embodiment of the invention through line I—I of FIG. 2.

Referring now to FIG. 1, there is shown a die holder assembly designated generally by the numeral 10 which is used to coat a wave guide fiber, passing along a fiber axis 112 from top to bottom through the center of the assembly, with a coating material. The die holder assembly 10 generally comprises a sizing die holder 20 in which is mounted a sizing die 21, a guide die holder 50 in which is mounted a guide die 51, and a die cap 70.

The sizing die holder 20 is a generally cylindrical member having a central bore 25 for receiving the guide die holder. The bore 25 has a substantially flat floor 33. A coating material groove 27 is formed on the outer surface 36 of the sizing die holder 20 providing a passageway for a coating material. Entry holes 26 are formed within the groove 27, connecting the groove to the central bore 25. The groove 27 and holes 26 are located near the floor 33 of the central bore 25.

Sizing die holder 20 has a central die mounting bore 24 extending through the floor 33. The sizing die 21 is preferably pressed into the bore 24 with a slight interference fit. The sizing die 21 has a central sizing die orifice 22. An end of the sizing die orifice facing the interior of the sizing die holder 20 may have a lead chamfer or radius 23 to improve the flow characteristics of the liquid coating. The sizing die orifice 22 surrounds the optical wave guide fiber (not shown) as it exits the die holder assembly, removing excess liquid coating material to form a uniform diameter coating on the optical wave guide fiber.

Between the coating material groove 27 and a top surface 35 of the sizing die holder 20, an outer process fluid groove 31 is formed in the outer surface 36 of the sizing die holder. Outer process fluid bores 32 communicate between the groove 31 and the central bore 25 of the sizing die holder. Four outer process fluid bores 32 are shown formed in the sizing die holder in FIG. 2; however, fewer or more bores may be used.

Returning to FIG. 1, the guide die holder 50 is a generally cylindrical member having an outer surface 58 sized for a precision slip fit in the central bore 25 of the sizing die holder. The guide die holder 50 has a head 56 that rests on the top surface 35 of the sizing die holder when the die holders are assembled.

The bottom surface 54 of the guide die holder forms, in conjunction with the central bore 25 and floor 33 of the sizing die holder, a reservoir 66 in which liquid coating material is maintained for coating the optical wave guide fiber. A guide die 51 is preferably pressed into a bore in the bottom surface 54 of the guide die holder 50 with a slight interference fit. The guide die 51 has a central guide die orifice 60 and a lead-in chamfer or radius 52 on the side facing away from the reservoir 66. Position tolerances of the guide die, the guide die holder, the sizing die, and the sizing die holder are maintained in order to assure that the guide die orifice 60 and the sizing die orifice 22 are substantially coaxial.

A central bore or chamber 53 extends from the guide die 51 along a fiber axis 112 of the guide die holder 50, terminating at the end of the guide die holder 50 opposite the guide die 51. A lead-in chamfer or radius 57 may be formed on the end of the guide die holder 50 to facilitate threading the optical wave guide fiber into the chamber 53 at start-up.

Figure 2:
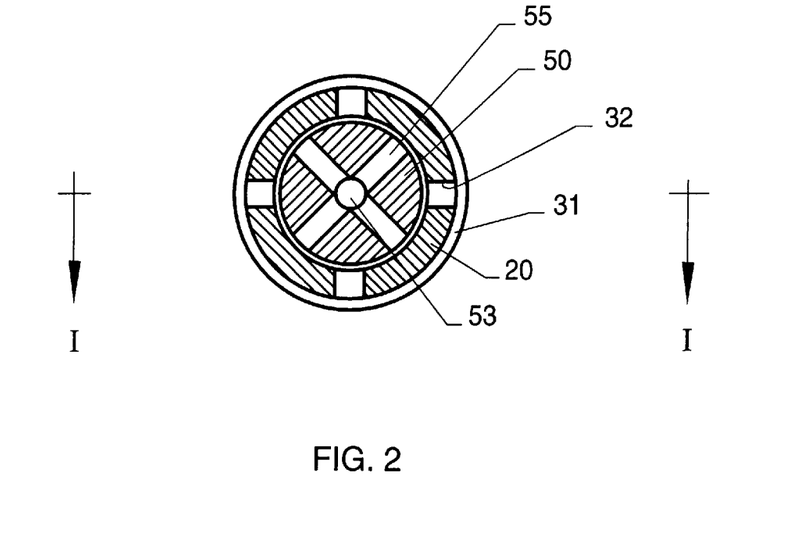
FIG. 2 is another cross sectional view of the die holder assembly of FIG. 1 through line II—II of FIG. 1.

The guide die holder 50 has an inner process fluid groove 54a on its outer surface 58 aligned with the outer process fluid bores 32 in the sizing die holder 20. Inner process fluid bores 55 are formed in the guide die holder, connecting the inner process fluid groove 54a with the chamber 53. While four inner process fluid bores 55 are shown in FIG. 2, more or fewer may be used. As shown in FIG. 2, the guide die holder and sizing die holder are assembled with a rotational orientation such that the inner and outer process fluid bores are not aligned. That misalignment promotes an even flow of process fluid into the chamber 53. For clarity of illustration, bores 55 are depicted in FIG. 1 in a position rotated 45 degrees to the position depicted in FIG. 2.

The die cap 70 captures the head 56 of the guide die holder 50 between an inner shoulder 72 of the die cap 70 and the top surface 35 of the sizing die holder 20. A central bore 73 of die cap 70 is aligned with the chamber 53, the guide die orifice 60 and the sizing die orifice 22, such that all of these elements are coaxial with the fiber axis 112. In the embodiment shown in FIG. 1, the central bore 73 of the die cap is slightly smaller than the diameter of the chamber 53, in order to avoid creating a shoulder that would interfere with the threading of the fiber during initial startup. The central bore 73 serves as an extension of the chamber 53. Thus, the central bore 73 defines the minimum diameter of the chamber 53.

Figure 3:
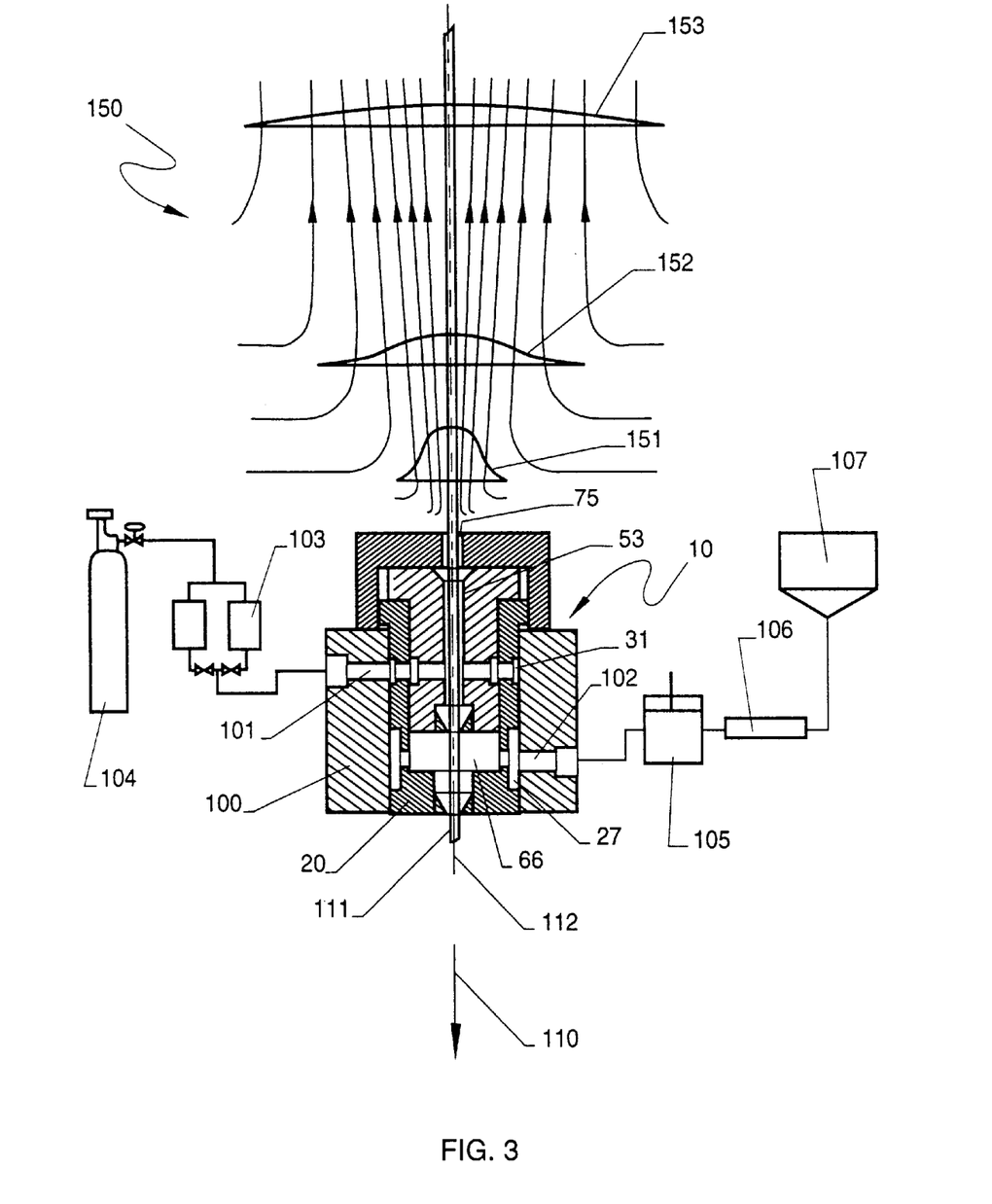
FIG. 3 is a schematic view of the coating apparatus of FIGS. 1–2 together with a fiber during a coating method in accordance with an embodiment of the invention.

The die holder assembly 10 is mounted in a manifold 100 as shown in FIG. 3. The manifold 100 has an inlet port 102 communicating with the liquid coating material groove 27 of the sizing die holder 20. The port 102 is connected to a coating material source 107, through a temperature maintaining means such as heater 106, through a pressure regulating means 105 and into the coating material port 102. Thus, a liquid coating material from source 107 may be supplied to the reservoir 66 such that the temperature and pressure of the coating material in the reservoir may be precisely maintained.

The manifold 100 also has a process fluid inlet 101 communicating with the outer process fluid groove 31 in the sizing die holder 20. A process fluid source 104 is connected through a pressure regulator 103 to the process fluid inlet 101. The process fluid from the source 104 can enter the outer fluid groove 31 (FIG. 2), pass through the outer process bores 32 into the inner process fluid groove 54a in the guide die holder 50. The process fluid can then pass from groove 54a into the inner process fluid bores 55, traveling rapidly through them into the chamber 53.

In a process according to one embodiment of the invention, an optical wave guide fiber 111 advances along the fiber axis 112 through the die holder assembly 10 in the direction of arrow 110, shown in FIG. 3. A liquid coating material is maintained in the reservoir 66 to adhere to the fiber 111 as it is pulled through sizing die 21 by conventional pulling equipment (not shown). The die 21 removes excess coating material to form the coated wave guide fiber 113, as shown in FIG. 4.

Figure 4:
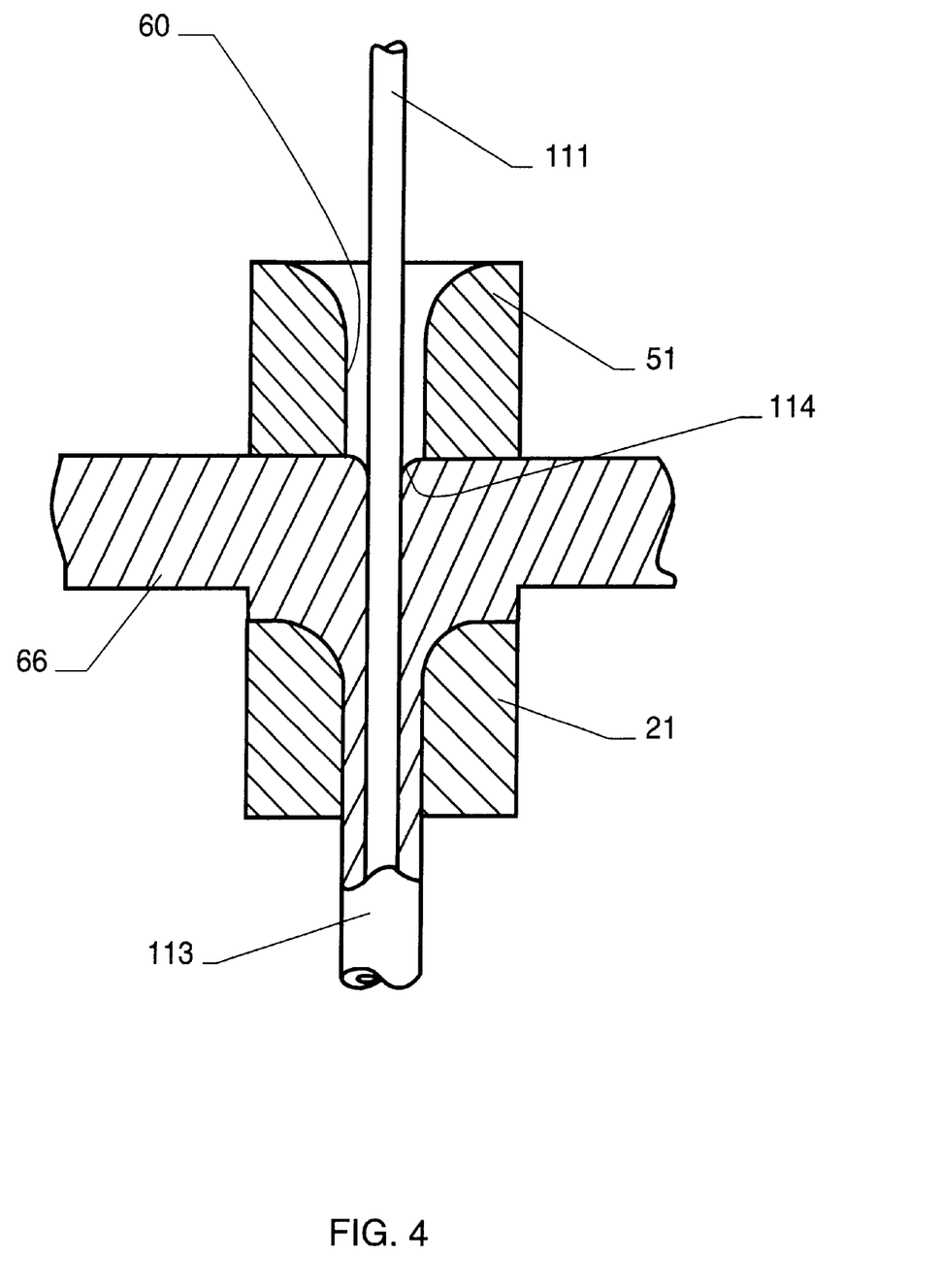
FIG. 4 is a schematic view of the guide and sizing dies of FIGS. 1–3 together with a wave guide fiber and a liquid coating material.

As best shown in FIG. 4, a meniscus 114 is formed in the liquid coating material within the reservoir 66 between the guide die 51 and the advancing optical wave guide fiber 111. The size and shape of that meniscus 114 is affected by the temperature and pressure of the liquid coating material entering the reservoir 66, as well as by the size of the guide die orifice 60.

The preferred liquid coating material is a UV curable epoxy or urethane acrylate. Carbon dioxide is the preferred process fluid for use in this embodiment of the invention because of its low cost and solubility in the liquid coating material. The process fluid is entrained on the incoming fiber 111 as the fluid exits the inner process fluid bores 55 and as it travels through the chamber 53, replacing all or most of the air boundary layer on the approaching optical fiber. It is believed that such replacement reduces bubbles in the coating of the finished optical fiber because the process fluid dissolves in the coating material more readily than air, although the present invention is not limited by that theory of operation.

Most of the process fluid entering the die holder assembly must exit through the chamber 53 surrounding the incoming fiber 111, as shown in FIG. 3. By controlling the size and geometry of the chamber 53 and the chamber inlet port 75, the velocity distribution of the process fluid passing through the chamber 53, and the process fluid jet 150 outside the chamber inlet port 75, may be configured to prevent particles from entering the die holder assembly and contaminating the liquid coating material. Essentially, a significant flow of fluid in the direction opposite to the fiber movement direction (upwardly as seen in FIG. 3) is formed within and outside the chamber to blow away particles which drift in from the surroundings or are entrained in the fiber boundary layer.

As shown in FIG. 3, an axisymmetric jet, indicated generally by numeral 150, is formed above the chamber inlet port 75 by the exiting process fluid. The jet 150 has overall flow in a direction opposite the direction 110 of the fiber movement direction. The velocity profiles 151, 152, 153 of the process fluid jet 150 as it exits the chamber inlet port 75 have maximum velocities near their centers, where the incoming fiber 111 is located. That high velocity serves to counteract the momentum of the air flow entrained by the fiber, preventing particles trapped in the fiber boundary layer from entering the die holder assembly 10. Further, a high speed pipe flow profile within the chamber 53 purges the chamber of particles within the die holder assembly.

It should be appreciated that the velocity profiles 151, 152, 153 are theoretical constructions based on the assumption that flow follows the theoretical flow pattern for a "free jet," i.e., a jet exiting from a port 75 into a surrounding medium (air) without other solid constraints. The velocity profiles shown do not reflect the influence of the fiber.

By evaluating the equations governing flow within the chamber 53 and within the jet 150 outside the chamber inlet port 75, it is possible to calculate the maximum velocity of the process fluid flow, the maximum inbound particle velocity which will stop at the chamber inlet port, and the amount of work done on a given particle by the jet 150, as the particle travels toward the chamber inlet port. Using these parameters, the performance of a given die holder assembly geometry may be predicted.

First, by determining the equilibrium condition wherein the weight of the particle equals the upward drag force created by the process fluid, a flow velocity necessary to prevent a given particle from drifting into the die holder assembly may be determined. A 50 micron diameter spherical silicon oxide particle is assumed, 50 microns being the diameter of the largest particle found embedded in a fiber coating in studies of current processes. The weight of the particle is:

$$Weight = \frac{4}{3} \cdot \pi \cdot R^3 \cdot \rho_{part} \cdot g$$

wherein the spherical radius R of the particle is 25 microns and the density $\rho_{part}$ is 2100 kg/m$^3$. The drag force on the particle is determined by first calculating the Reynolds number, $R_e$, and the coefficient of drag, $C_d$, as a function of process fluid velocity V:

$$Re = \frac{V \cdot 2 \cdot R}{v_{gas}}$$

$$C_d = \frac{24}{Re} + \frac{6}{(1 + \sqrt{Re})} + 0.4$$

$$Drag = \frac{1}{2} \cdot \rho_{gas} \cdot V^2 \cdot \pi \cdot R^2 \cdot C_d$$

The kinematic viscosity $v_{gas}$ of the process fluid, assumed to be $CO_2$, is $6 \cdot 10^{-6}$ m$^2$/sec., and its density, $\rho_{gas}$, is 1.5 kg/m$^3$. The equilibrium condition is described by equating the weight and drag forces:

$$\frac{4}{3} \cdot \pi \cdot R^3 \cdot \rho_{part} \cdot g = \frac{1}{2} \cdot \rho_{gas} \cdot V^2 \cdot \pi \cdot R^2 \cdot C_d$$

$$V^2 = \frac{8}{3} \cdot \frac{\rho_{part}}{\rho_{gas}} \cdot g \cdot \frac{R}{C_d}$$

By using iterative techniques, it is found that the flow velocity of carbon dioxide required to suspend a 50 micron diameter silica particle is 25.4 cm/sec. The equilibrium velocity gives a rough estimate of the flow necessary to stop a particle that has no initial downward momentum. Thus, if a 50 micron diameter silica particle were disposed above the inlet port with no downward motion, a carbon dioxide flow having a velocity of 25.4 cm/sec would hold the particle suspended in midair.

In fiber drawing, however, a particle caught in the fiber boundary layer has momentum that must be counteracted in order to prevent it from entering the die holder assembly and contaminating the coating. In a typical fiber drawing process, the fiber advances into the inlet port 75 at a rapid rate, typically greater than 10 meters per second. Any particles entrained on the fiber or in the boundary layer surrounding the fiber move at approximately the same rate. Thus, the flow of process fluid through the chamber must create a flow field that does sufficient work on the particle to reverse its direction. Decay of the jet 150 as it extends outward from the chamber inlet port 75 thus becomes important.

Figure 6:
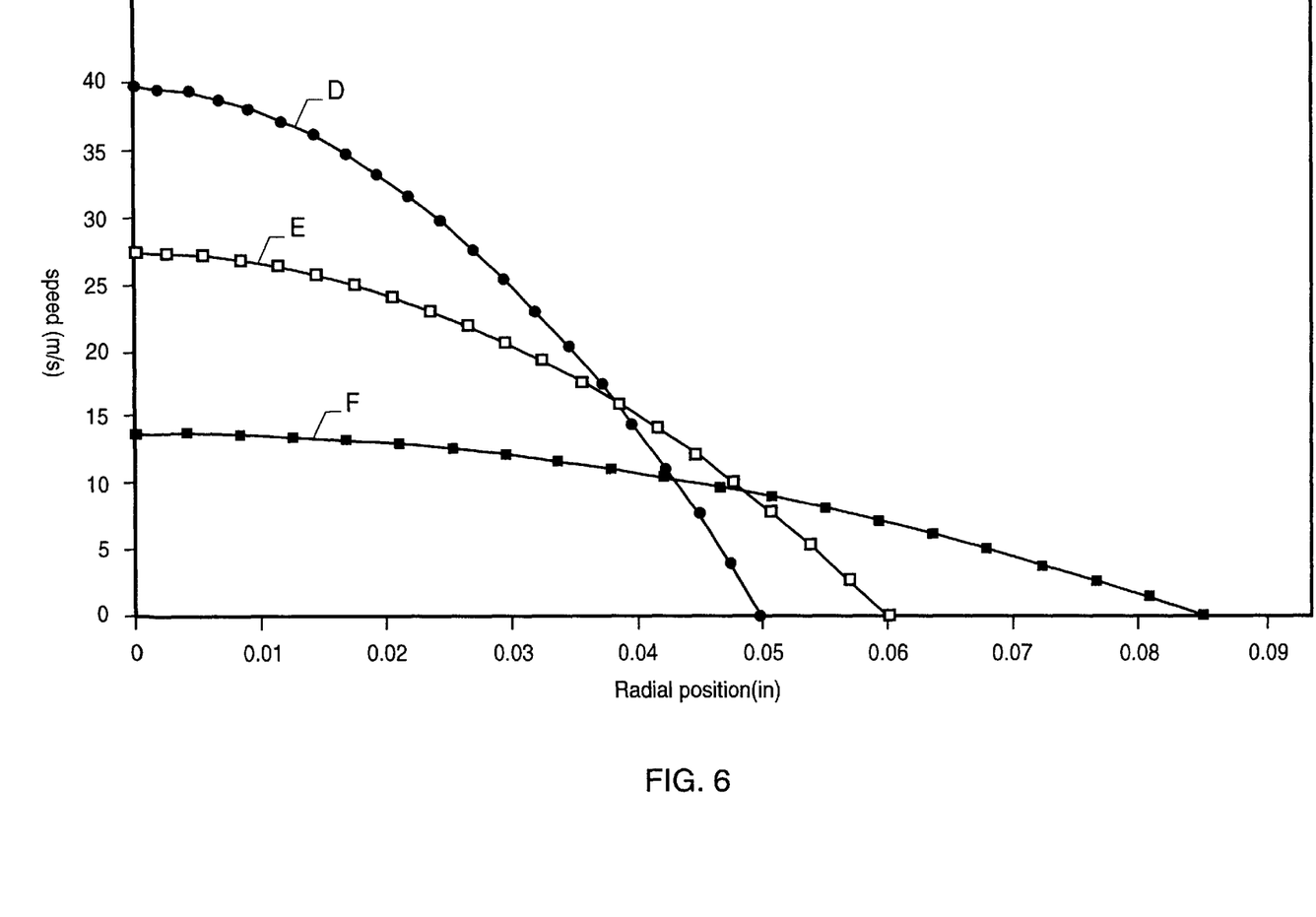
FIG. 6 is a chart showing the theoretical velocity profiles within the chamber for several chamber diameters.

The controlling equations for describing the motion of a particle traveling through the jet 150 and through the chamber 53 are set forth below. First, the velocity of the flow within the chamber 53, as a function of the radial location y in the chamber is:

$$U_{pipe}(y) = \frac{2}{\pi} \cdot Q \cdot \left[ \frac{1}{r_0^2} - \left( \frac{y}{r_0^2} \right)^2 \right]$$

wherein the chamber radius is $r_o$ and the volumetric flow rate of process fluid through the chamber 53 is Q. A graphical depiction of the resulting profile of the flow velocity within the chamber 53 is shown in FIG. 6 for several chamber diameters or orifice sizes. It can be seen in this chart that for a smaller orifice size, such as 0.100 inches, the velocity increases rapidly near the chamber wall as compared to a larger orifice size such as 0.170 inches, which has a flatter profile. Thus, particles entering the chamber near the chamber wall are more likely to be repelled in the case of a smaller orifice size. In addition, the maximum velocity of the process fluid occurs at the centerline of the chamber, where particles are entrained in the fiber boundary layer. A smaller orifice size results in a higher centerline velocity.

The theoretical maximum pipe velocity at the centerline of the pipe flow profile within the chamber is:

$$U_{pipe/\max} = \frac{2}{\pi} \cdot Q \cdot \frac{1}{r_o^2} \qquad (1)$$

As used in this disclosure, the term "theoretical maximum pipe velocity" should be understood as referring to the theoretical maximum velocity at the centerline, and at the smallest diameter portion of the chamber through which the process fluid is discharged calculated according to equation (1). Unless otherwise indicated, the term "theoretical maximum velocity" as used herein is the theoretical maximum pipe velocity. Again, in the embodiment of FIG. 1, the chamber inlet port 75 defines the smallest-diameter portion of the chamber. That diameter determines the effectiveness of the chamber 53 in repelling particles. The theoretical maximum pipe velocity for several different orifice sizes, for a given set of flow parameters, is shown in the chart of FIG. 6 as the "maximum speed", occurring at "radial position"=0, or the center of the pipe. Another measure of effectiveness is the measured maximum velocity within the smallest-diameter portion of the chamber, as measured with an instrument capable of measuring flow velocities at a point without substantially disturbing the flow field.

The theoretical maximum jet velocity in the axisymmetric jet extending from the chamber inlet port 75, as a function of the distance x from the chamber inlet port 75, is:

$$U_{\max jet}(x) = \frac{1}{2 \cdot \pi^2} \cdot \frac{Q^2}{v_{gas} \cdot r_0^2} \cdot \frac{1}{x} \qquad (2)$$

where $v_{gas}$ is the kinematic viscosity of the process fluid, and the velocity $U_{max\ jet}$ is a theoretical maximum jet velocity in center of the flow profile of the jet. This is a "far field" approximation of the centerline axisymmetric jet flow velocity valid only for points outside of the chamber, some distance from the orifice. It is assumed that the velocity in the jet is no greater than the theoretical maximum pipe velocity, i.e., that the flow behaves as a pipe flow until it reaches a distance x* such that $U_{max\ jet}(x^*)$ calculated according to equation (2) is equal to $U_{pipe\ max}$ calculated according to equation (1) and that at x*, $r_o$ in equation (2) (the radius of the jet) is the chamber radius at the chamber inlet port. The theoretical maximum jet velocity can be calculated for a given set of parameters as another measure of the effectiveness of the jet flow in repelling particles.

Both in the chamber and in the jet, the drag force Drag(x) on a spherical silica particle as it moves through the flow of process fluid along the center line of the flow, can be expressed as a function of the coordinate x along the fiber axis. First, the Reynolds number Re(x) and the coefficient of drag $C_{d(x)}$ on the particle at the centerline of the jet are expressed as a function of x:

$$Re(x) = \frac{U_{\max}(x) \cdot 2 \cdot R}{v_{gas}} \qquad (3)$$

$$C_d(x) = \frac{24}{Re(x)} + \frac{6}{(1 + \sqrt{Re(x)})} + 0.4 \qquad (4)$$

In any portion of the chamber, $U_{max}$ is $U_{pipe\ max}$, calculated in accordance with equation (1) for the chamber diameter at that point along the chamber. In any portion of the jet, $U_{max}$ is $U_{max\ jet}$ calculated in accordance with equation (2). The drag force on the particle due to the flowing process fluid as a function of x is:

$$Drag(x) = \frac{1}{2} \cdot \rho_{gas} \cdot U_{\max}(x)^2 \cdot \pi \cdot R^2 \cdot C_d(x) \qquad (5)$$

Having defined the forces acting on the silica particle as it travels through the process fluid flow, Newton's second law may be applied to the system in order to determine the change in velocity ΔV over a given distance from $x_1$ to $x_2$ for a given drag force function Drag(x):

$$F = m \cdot a \tag{6}$$

$$F = Drag(x) - Weight$$

$$a = \frac{dV}{dt}$$

$$V = \frac{dx}{dt}$$

$$\int V\,dV = \int \frac{F}{m}\,dx$$

$$\Delta V^2 = \frac{V(x_1)^2}{2} - \frac{V(x_2)^2}{2} = \frac{1}{m} \cdot \int_{x_1}^{x_2} F(x)\,dx$$

Approximating ΔV over the entire jet, i.e. from $X=X_L$, a distance from the inlet port 75 at which the drag force due to the jet is considered negligible, to x=o, at the inlet port, a change in velocity over the jet $\Delta V_{jet}$ can be expressed:

$$\Delta V_{jet} = \sqrt{\frac{2}{mass} \cdot \left[\int_{X_L}^{0} (Drag(x) - Weight)\,dx\right]} \tag{7}$$

$\Delta V_{jet}$ is also an estimate of the maximum particle velocity stopped by the jet before entering the chamber inlet port.

Using a discretized estimate of the above integral of the force F(x) on the particle, several useful parameters for describing the motion of a particle within the chamber 53 may be estimated. Further simplifying by neglecting particle weight, which is considered negligible by comparison to drag for particle velocities over 5 meters per second, the relationship between the distance Δx within the chamber and the change in particle velocity $\Delta V_{pipe}$ over the distance Δx can be expressed as a function of the relative velocity $V_{gas}$ of the particle in the process fluid:

$$\Delta x = \frac{\rho_{part}}{\rho_{gas}} \cdot \frac{4}{3} \cdot \frac{R}{C_d} \cdot \frac{(\Delta V_{pipe})^2}{(V_{gas})^2} \tag{8}$$

wherein $\rho_{part}$ and $\rho_{gas}$ are the densities of the particle and the process fluid, respectively, R is the particle radius, $V_{gas}$ is the velocity of the process fluid flow at the beginning of Δx, and $C_d$ is the coefficient of drag at the centerline of the pipeflow. Rearranging to find the maximum particle velocity that can be stopped in a given distance Δx:

$$\Delta V_{pipe} = \sqrt{\frac{\rho_{gas}}{\rho_{part}} \cdot \frac{3}{4} \cdot \frac{C_d}{R} \cdot (V_{gas})^2 \cdot \Delta x} \tag{9}$$

Where the chamber has different radii R over different portions of its length x, the expressions for Δx and ΔV can be applied separately over each portion of the chamber. The simplifications made in these expressions result in an underprediction of the drag force; therefore, the change in velocity is lower than the actual value, and the distance $\Delta x$ required to produce a given change in velocity is more than the actual value.

The maximum initial particle velocity $\Delta V_{part}$ which can be stopped by the process gas flow before reaching the coating fluid reservoir is equal to the sum of $\Delta V$ in the chamber and in the jet, i.e., $$\Delta V_{part} = \Delta V_{jet} + \Sigma \Delta V_{pipe} \qquad (10)$$

in which $\Sigma \Delta V_{pipe}$ is $\Delta V_{pipe}$ as evaluated over the entire chamber, from the point of introduction of the process fluid to the chamber inlet port. For any given process fluid flow in the chamber and in the jet, and for a given particle radius and density, the value of $\Delta V_{part}$ is calculable according to the foregoing equations. $\Sigma \Delta V_{pipe}$ increases with the length of the chamber carrying the process gas flow, i.e., from gas inlet ports 55 to chamber inlet port 75 in the embodiment of FIG. 1. $\Delta V_{part}$ decreases with increasing particle radius and with increasing particle density. If $\Delta V_{part}$ is greater than the incoming fiber velocity, then particles of the given radius and density, entrained in the fiber boundary layer, will be stopped before reaching the reservoir. Preferably, $\Delta V_{part}$ is greater than the fiber velocity for a particle having the density of silica and a diameter of 50 microns or more. More preferably, $\Delta V_{part}$ is greater than the fiber velocity for even larger particles having the density of silica, such as 100 microns or more. In an even more conservative design approach, $\Delta V_{jet}$ or $\Sigma \Delta V_{pipe}$ may be greater than the fiber velocity.

Figure 5:
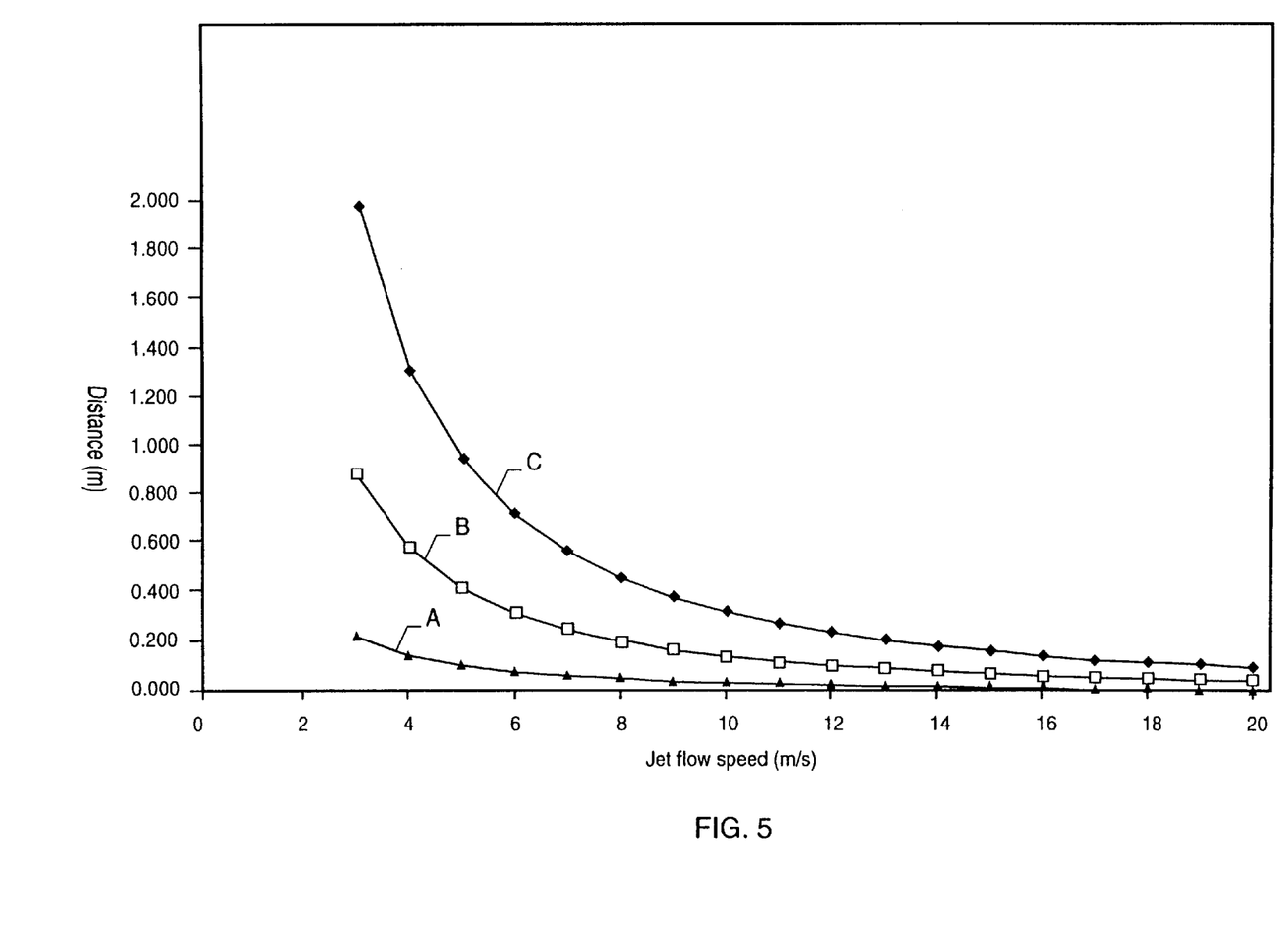
FIG. 5 is a chart comparing the stopping distances of particles having several initial velocities in various process fluid jet velocities.

FIG. 5 is a graphical representation of the calculated distances required to stop a 50 micron diameter silicon particle traveling in a constant velocity carbon dioxide flow in the chamber as a function of the flow velocity. Particle weight is neglected. Curves A, B, and C represent initial particle velocities of 10 m/s, 20 m/s and 30 m/s, respectively. It may readily be seen by this chart that flow speed has a strong effect on the stopping distance of particles. Moreover, increasing the flow speed greatly decreases the difference in stopping distances between particles having various initial velocities. For example, at a 3 meter per second flow velocity ($U_{pipe\ max}$), there is a difference of approximately 1.75 meters between the stopping distances of a particle having an initial velocity of 10 meters per second and a particle having an initial velocity of 30 meters per second. At a flow velocity of 6 meters per second, that differential between stopping distances is reduced to less than 0.65 meters. The chart demonstrates the ability of a jet having a high flow speed to stop particles having a wide range of initial velocities.

Figure 7:
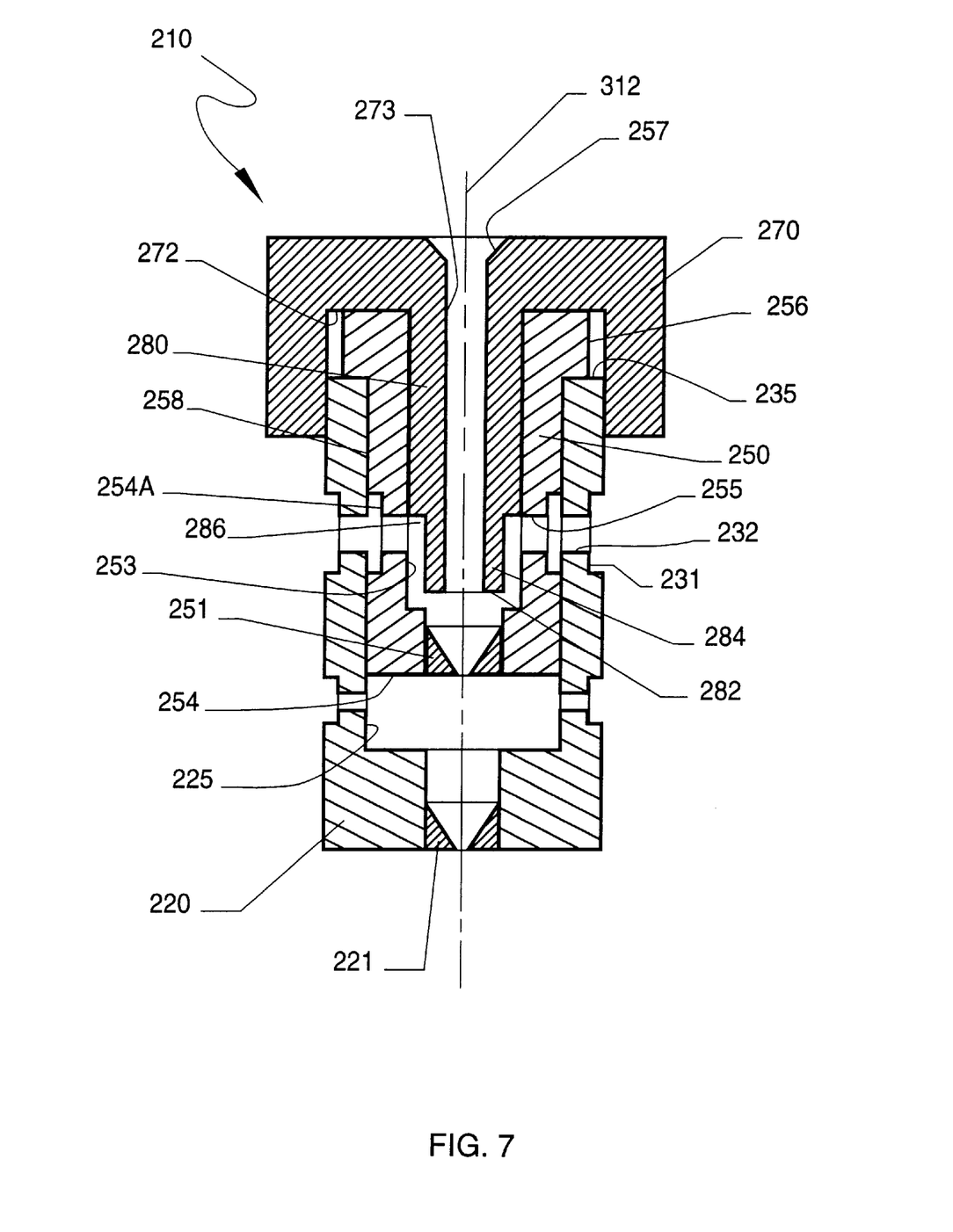
FIG. 7 is a cross-sectional view of a die holder assembly according to a further embodiment of the invention.

Equations (8) and (9) defining the maximum inbound particle velocity $\Delta V_{pipe}$ that can be stopped in $\Delta x$ may be used to predict the effectiveness of various minimum chamber diameters and process fluid flow rates. For example, at a fluid flow rate Q of 6 liters per minute and a required stopping distance $\Delta x$ of 2 centimeters, a chamber diameter of 0.100 inches produces a process fluid flow which is capable of stopping a 50 micron particle initially traveling at 22.9 meters per second. In contrast, under the same conditions, a bore of 0.170 inches with the same process fluid flow rate produces a jet capable of stopping a particle with a maximum initial speed of only 9.5 meters per second. Larger diameter bores have still less stopping ability. Conversely, apparatus according to the preferred embodiments of the invention can provide relatively high-velocity fluid flow around the fiber for a given mass flow rate. Curves D, E, and F of FIG. 6 show the theoretical velocity profiles for carbon dioxide flowing at 6 SLPM through chambers having diameters of 0.100 inch, 0.120 inch and 0.170 inch, respectfully. Thus, it can be seen that apparatus having a maximum chamber diameter of about 0.100 inches can provide a theoretical maximum pipe velocity of about 39 meters per second with a fluid flow rate of 6 standard liters per minute.

Another result which is apparent from equations (8) and (9) is that the pipe flow region of the chamber carrying the process fluid (from the point where the fluid enters the chamber to the chamber inlet port) should be longer than $\Delta x$ for the maximum expected particle size moving at the fiber velocity.

In addition to the increased particle-stopping capability of a jet formed by a small minimum chamber diameter, the small diameter also provides passive protection against the entry of particles by providing a reduced target area. For example, a 0.100 inch diameter chamber provides a target area of only 35% of a 0.170 inch diameter chamber.

By designing the chamber inlet port 75 to maximize process fluid exit velocity at the chamber inlet port, while still providing sufficient clearance for fiber alignment, substantially all ambient particulate contaminants in a typical draw environment may be kept out of the die holder assembly. The chamber inlet port of the invention establishes a strong upward jet emanating from the chamber inlet port to reject particles moving downward at fiber speed, trapped in the fiber boundary layer.

In contrast, previous die holder assemblies were not designed to take advantage of the exiting process fluid to prevent particles from entering the die holder. For example, one existing die holder assembly has a chamber diameter above the process fluid inlets of approximately 0.500 inches. That design produces a relatively slow maximum process fluid speed of about 1.01 meters per second, which could easily be disturbed by ambient air currents in the draw environment. That flow only provides protection against particles moving downward at a maximum of 1.45 meters/second. Particles traveling at typical fiber draw speeds would not be repelled by that process fluid flow.

Other embodiments of the above-described method and apparatus will be apparent to those skilled in the art. For example, the chamber 53 may extend from another point remote from the guide die, between the guide die 51 and the end of the guide die holder 50, in which case a fiber clearance hole (not shown) connects the chamber 53 with the guide die orifice 60. Further, while the chamber 53 is shown in FIG. 1 to be uniformly cylindrical throughout its length, other shapes may be used and still practice the invention. For example, the chamber 53 may have a conical form, with the small end of the cone near the guide die end of the guide die holder. Other surfaces of rotation, as well as prismatic shapes, may also be used.

The die holder assembly periodically needs to be cleaned and then inspected by observation through a microscope. The embodiment of FIG. 7 facilitates the inspection procedure. Die holder assembly 210 includes a sizing die holder 220 in which is mounted a sizing die 221, a guide die holder 250 in which is mounted a guide die 251, and a die cap 270. That portion of assembly 210 between the bottom surface 254 of guide die holder 250 and the bottom surface of sizing die 221 is essentially the same as assembly 10 of FIG. 1.

Guide die holder 250 is a generally cylindrical member having an outer surface 258 sized for a precision slip fit in the central bore 225 of the sizing die holder; it has a head 256 that rests on the top surface 235 of the sizing die holder when the die holders are assembled. A bore 253 extends from the guide die 251 to the top of head 256. Guide die holder 250 has an inner process fluid groove 254a on its outer surface 258 aligned with the outer process fluid bores 232 in the sizing die holder 220. Bores 232 communicate between the groove 231 and the central bore 225 of the sizing die holder. Inner process fluid bores 255 are formed in the guide die holder, connecting the inner process fluid groove 254a with the bore 253. In a manner similar to that shown in FIG. 2, the guide die holder and sizing die holder are assembled with a rotational orientation such that the inner and outer process fluid bores are not aligned.

Die cap 270 captures the head 256 of guide die holder 250 between die cap inner shoulder 272 and top surface 235 of sizing die holder 220. Cap 270 includes a centrally located protrusion 280 that extends axially downwardly from inner shoulder 272. The lower end 282 of protrusion 280 is located a distance from the top of guide die 251 that is sufficient to enable the process fluid to flow around it in an unrestricted fashion. The bottom portion of protrusion 280 has a region 284 of narrowed diameter that is aligned with bores 255 to provide an annular region 286 into which process fluid from bores 255 can flow.

Die cap 270 has a central bore 273 that is aligned with the guide and sizing die orifices, such that all of these elements are coaxial with fiber axis 312. A lead-in chamfer 257 at the upper end of bore 273 facilitates optical fiber threading.

Assembly 210 is disassembled to clean the dies. After the cleaning process is completed, guide die 251 can easily be inspected through the relatively large diameter bore 253. Process fluids other than carbon dioxide, such as nitrogen, the Group VIII or so-called noble gases, e.g., xenon neon, argon and the like, and chemically inert halocarbons gases or vapors thereof, such as chloroform, Freon® halocarbons, or other chlorine- or fluorine-substituted hydrocarbons, may be substituted. In addition, a process liquid that is compatible with the coating material may be used as a process fluid. The greater density of the liquid make it advantageous in stopping particulate contaminants.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as set forth in the appended claims.

We claim:

1. A method for applying a coating to an optical fiber, comprising:
    passing the optical fiber into a coating die assembly including a chamber having a minimum diameter of less than about 0.180 inches and a reservoir containing a coating liquid and then through the reservoir and out of the reservoir so that a coating of the liquid adheres to the fiber passed out of the reservoir; and
    applying a flow of a process fluid gas which inhibits bubble formation into said coating die assembly and out through said chamber so that the fluid flows along the incoming fiber in a direction opposite to the direction of movement of the fiber and so that the flowing process fluid gas has a measured maximum velocity of at least 1.5 meters per second near the fiber, whereby said flowing process fluid gas will impede entry of particles into said coating die assembly.

2. The method of claim 1, wherein the step of applying a flow of a process fluid gas which inhibits bubble formation comprises the step of creating a flowing process fluid gas theoretical maximum velocity of at least 10 meters per second.

3. The method of claim 1 wherein the step of passing the optical fiber into the reservoir is performed by passing the optical fiber through a chamber inlet port into a chamber and passing the fiber from the chamber into said reservoir, and then through said reservoir to a fiber outlet and wherein the step of applying a process fluid includes the step of pressurizing the chamber with the process fluid so that the process fluid is vented away from the reservoir and through the chamber inlet port.

4. The method as claimed in claim 3 wherein said step of venting fluid includes the step of maintaining process fluid flow within the chamber in a direction opposite to the direction of movement of the fiber, from a location between the reservoir and the chamber inlet port to the chamber inlet port, so that the process fluid has a theoretical maximum pipe velocity of at least 1.5 meters per second within the chamber.

5. The method of claim 4 wherein the maximum velocity of a particle having density of 2.1 gm/cm$^3$ and a diameter of 50 microns which can be stopped by said process fluid flow before reaching said reservoir is greater than the velocity of the fiber towards said reservoir.

6. The method of claim 3, wherein said process fluid is vented at a rate selected from the group comprising less than 10 standard liters per minute and approximately 6 standard liters per minute.

7. The method of claim 1 wherein the step of passing the optical fiber includes passing the optical fiber through a chamber having a minimum diameter of about 0.100 inches or less.

8. The method of claim 7 wherein the step of passing the optical fiber includes the step of passing the optical fiber through a chamber inlet port adjacent one end of the chamber and wherein the diameter of the chamber inlet port is less than a minimum diameter of the chamber.

9. The method of claim 7 wherein the step of applying a flow of a process fluid gas which inhibits bubble formation comprises the step of delivering the process fluid gas at a flow rate of about 6 liters per minute to create a fluid flow capable of impeding particles about 50 $\mu$m or larger traveling at speeds of about 22.9 meters per second or greater.

10. The method of claim 1, wherein the step of applying a flow of a process fluid gas which inhibits bubble formation comprises the step of creating a flowing process fluid gas theoretical maximum velocity of about 39 meters per second or less.

11. Apparatus for applying a coating to an optical fiber comprising:
    (a) a die holder having an inlet end and an outlet end;
    (b) a sizing die adjacent the outlet end of the die holder, said sizing die defining a sizing die orifice;
    (c) a guide die disposed between the sizing die and the inlet end of the die holder, said guide die defining a guide die orifice, the guide die orifice and sizing die orifice being generally coaxial with one another on a fiber axis, the sizing and guide dies and the die holder defining a liquid reservoir between the sizing and guide dies for containing a coating liquid;
    means defining a chamber surrounding the fiber axis between the guide die and the inlet end of the die holder, said chamber having a minimum diameter of less than 0.180 inches at a location along said fiber axis;

a process fluid port communicating with the chamber between said guide die and said location, whereby a fiber can be moved along the fiber axis through the chamber and through the reservoir and a process fluid may be admitted to the chamber and pass from the chamber away from the liquid reservoir around the fiber at said location.

12. The apparatus of claim 11 wherein the die holder comprises a sizing die holder for retaining the sizing die, a guide die holder for retaining the guide die and a die cap at said inlet end for connecting the sizing die holder to the guide die holder.

13. The apparatus of claim 12 wherein said die cap comprises a protrusion that extends toward said guide die, and wherein said chamber is defined by a bore through said protrusion.

14. The apparatus of claim 13 wherein that portion of said protrusion adjacent said guide die has a diameter smaller than that portion of said protrusion that is remote from said guide die.

15. The apparatus of claim 11 wherein the minimum diameter is less than about 0.150 inches.

16. The apparatus of claim 11 wherein the minimum diameter is about 0.100 inches.

17. The apparatus of claim 11 wherein said chamber has a maximum diameter of less than 0.200 inches.

18. The apparatus of claim 17 wherein said chamber has a maximum diameter of less than 0.200 inches for a length of at least 0.400 inches.

19. The apparatus of claim 17 wherein the minimum diameter is about 0.100 inches.

* * * * *